United States Patent [19]

Tokiwa et al.

[11] Patent Number: 5,010,467
[45] Date of Patent: Apr. 23, 1991

[54] CONTROL APPARATUS OF DC POWER COUPLING SYSTEM

[75] Inventors: Yukio Tokiwa, Tokyo; Fumitoshi Ichikawa, Urawa; Naomi Nakamura, Tokorozawa; Syunichi Hirose, Tokyo; Haruhisa Inokuchi, Kunitachi, all of Japan

[73] Assignees: The Tokyo Electric Power Co., Inc., Tokyo; Kabushiki Kaisha Toshiba, Kawasaki, both of Japan

[21] Appl. No.: 430,577

[22] Filed: Nov. 1, 1989

[30] Foreign Application Priority Data

Nov. 2, 1988 [JP] Japan ................. 63-277934

[51] Int. Cl.⁵ .................. H02M 5/45; H02J 3/06
[52] U.S. Cl. .................. 363/37; 363/71; 323/207; 307/58; 307/82
[58] Field of Search .......... 363/35, 37, 40, 41, 363/58, 65, 71, 98, 132; 323/207; 307/52, 58, 59, 61, 62, 63, 77, 82

[56] References Cited

U.S. PATENT DOCUMENTS

| | | | |
|---|---|---|---|
| 4,251,736 | 2/1981 | Coleman | 307/66 X |
| 4,517,634 | 5/1985 | Sakai | 363/35 |
| 4,639,848 | 1/1987 | Sakai | 363/35 X |

OTHER PUBLICATIONS

"Semiconductor Power Conversion Circuit, " Special Committees on Method for Semiconductor Conversion of Institute of Electrical Engineering, Mar. 31, 1987 (pp. 211-212) (pp. 216-217).

Primary Examiner—Steven L. Stephan
Assistant Examiner—Emanuel Todd Voeltz
Attorney, Agent, or Firm—Oblon, Spivak, McClelland, Maier & Neustadt

[57] ABSTRACT

A coupling system in which power converters are coupled through a DC circuit to exchange active power between the converters comprises a control apparatus for controlling active power exchanged between each converter and its AC system. The control apparatus includes an automatic active power regulator for regulating active power exchanged between the converters and the AC system to be equal to be predetermined active power reference value, and an automatic DC voltage regulator for regulating a DC voltage of the DC circuit to be equal to a predetermined DC voltage reference value. When an output signal from the automatic active power regulator of each converter is input as an upper limit value of an output signal from the automatic DC voltage regulator, a DC voltage reference value of one converter is set to be equal to or larger than a DC voltage reference value of the remaining power converter.

15 Claims, 9 Drawing Sheets

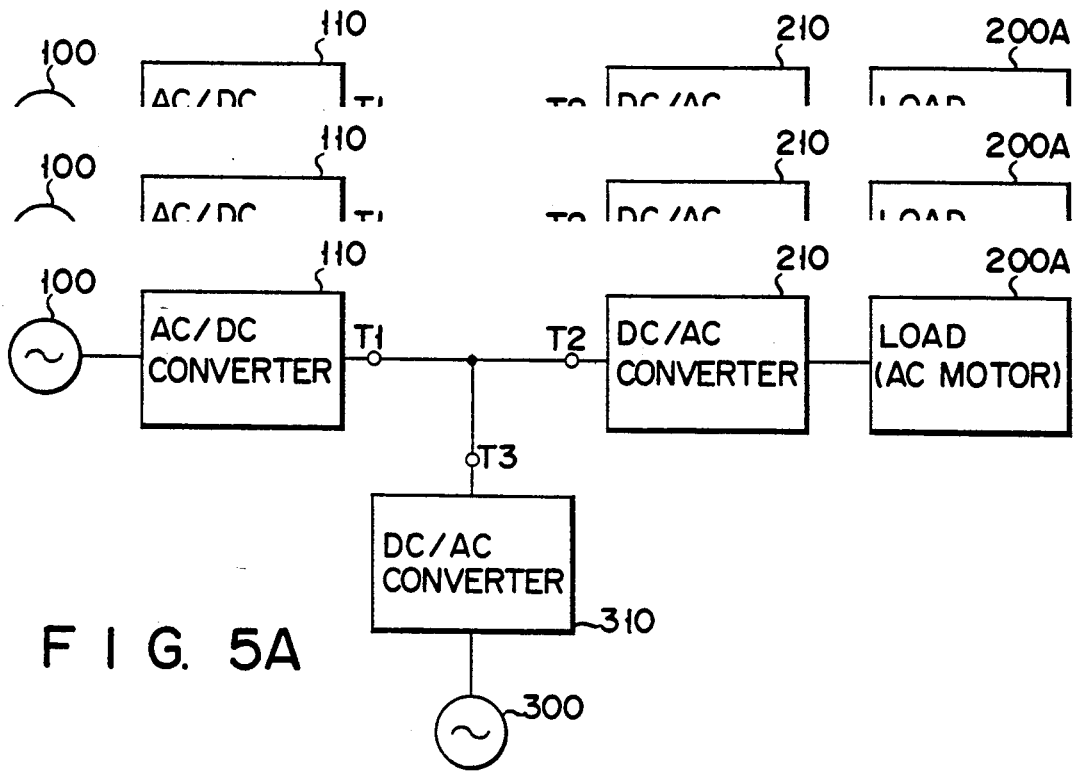
FIG. 5A
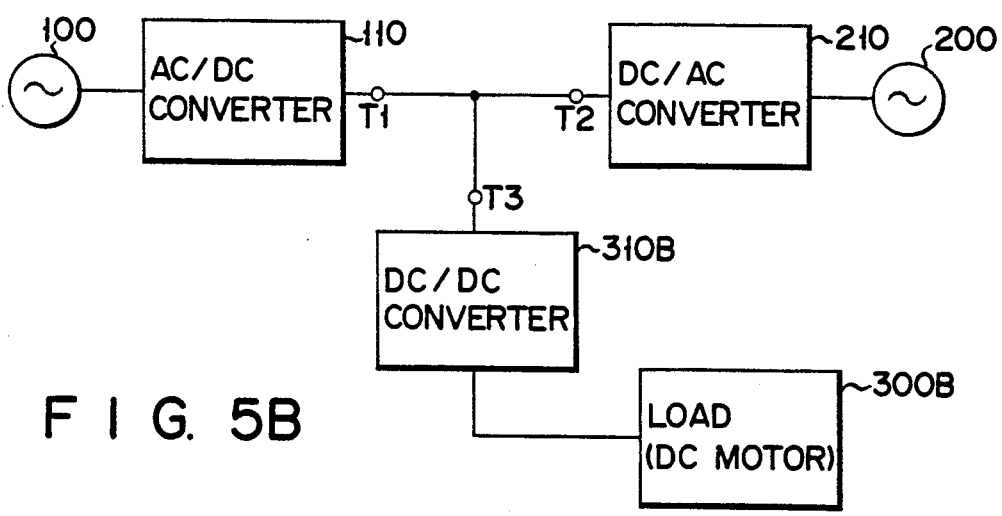
FIG. 5B
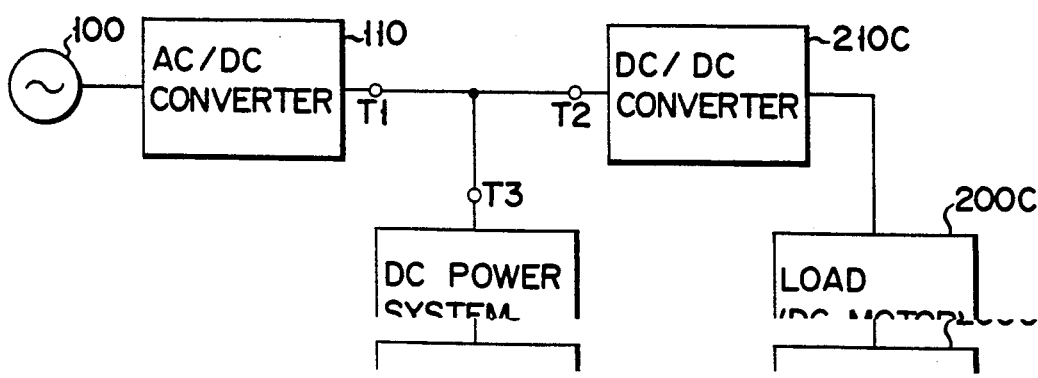

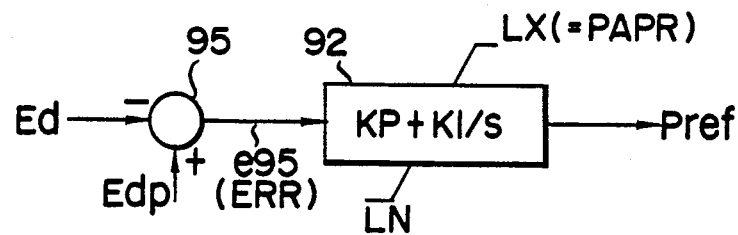
F I G. 10
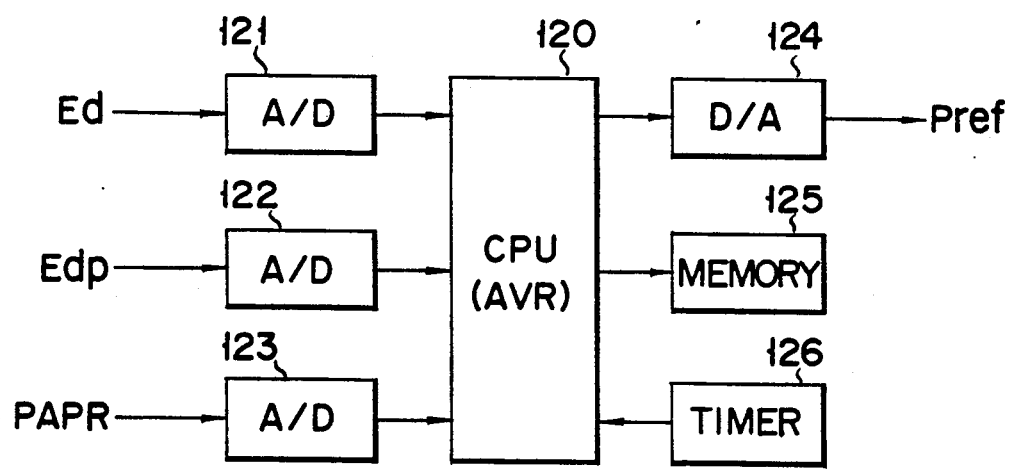
F I G. 11

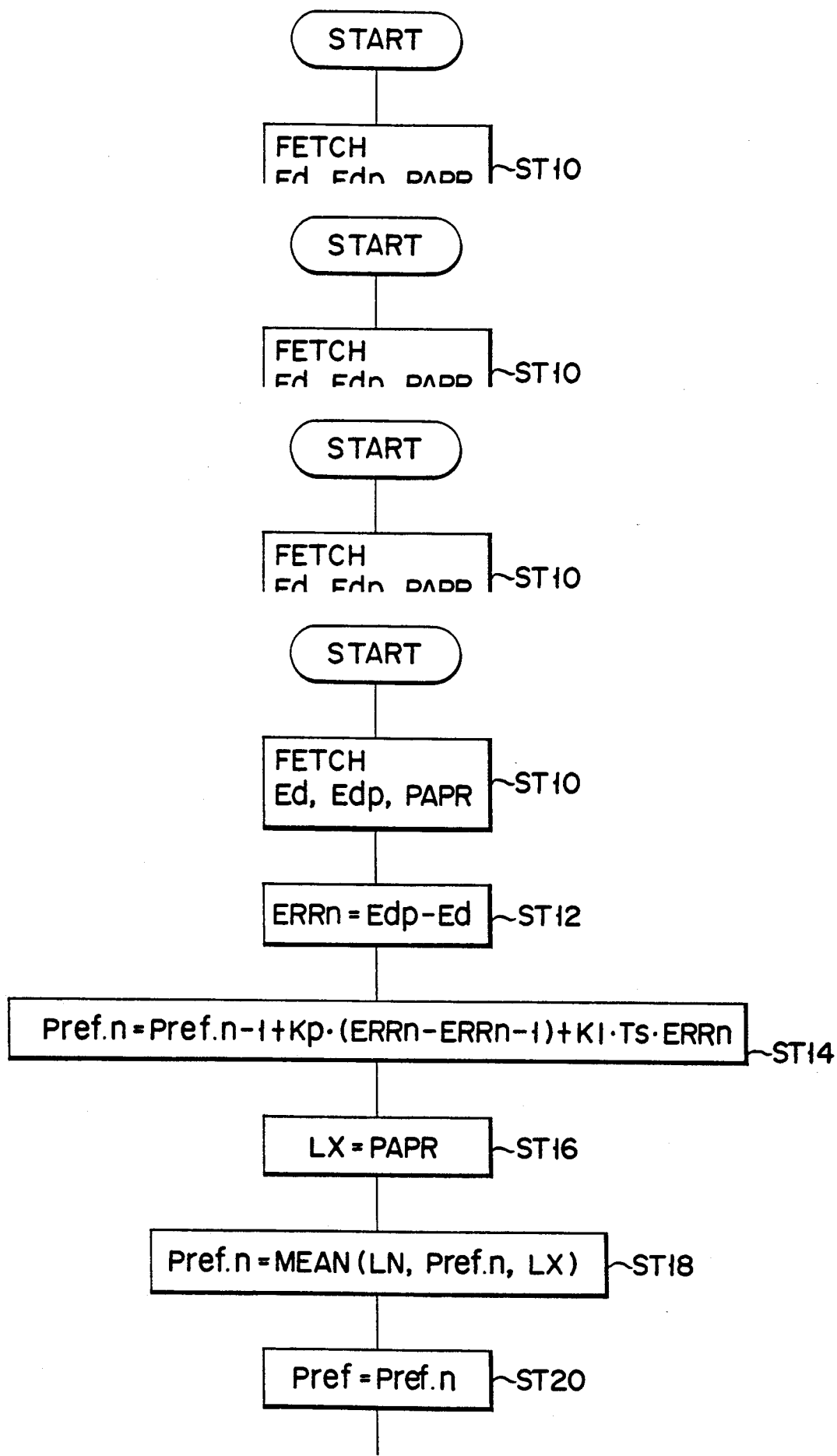

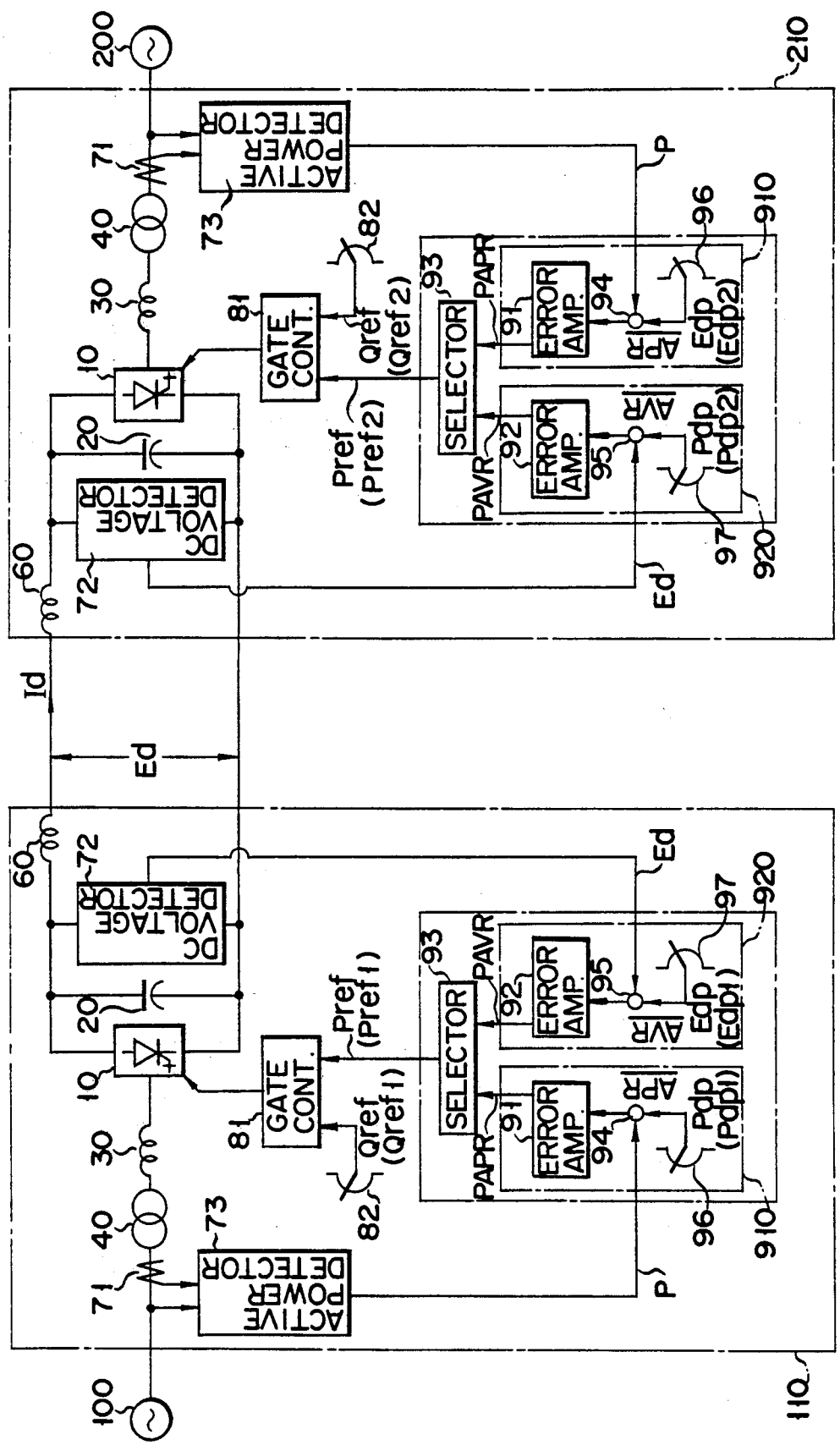
F I G. 13

CONTROL APPARATUS OF DC POWER COUPLING SYSTEM

BACKGROUND OF THE INVENTION

1. Field of the Invention

The present invention relates to a control apparatus of a DC power coupling system for exchanging power between AC power systems using voltage source type self-exciting power converters.

2. Description of the Related Art

A conventional apparatus has the following problems. Assume that two power converters are coupled to each other through a DC circuit, and one converter for regulating a DC voltage of the DC coupling circuit stops its operation due to, e.g., a failure. In this case, the other converter for regulating active power must stop its operation although an operation for exchanging reactive power between itself and an AC system connected thereto can be performed. Note that, even if the other converter for regulating active power stops its operation, one converter for regulating a DC voltage can continue its operation at an operating point where a direct current of the DC coupling circuit is set to be zero, and reactive power can be exchanged between one converter and the AC system connected thereto.

SUMMARY OF THE INVENTION

It is accordingly an object of the present invention to provide a control apparatus of a DC power coupling system in which power converters are coupled through a DC terminal or a DC line to exchange active power between the converters, and even if one converter abruptly stops its operation, the remaining converter(s) can continue a stable operation.

In order to achieve the above object, there is provided the following configurations.

A coupling system in which power converters are coupled through a DC circuit (a DC terminal or a DC line) to exchange active power between the converters comprises a control apparatus for controlling active power exchanged between each converter and its AC system. The control apparatus includes an automatic active power regulator for regulating active power exchanged between the converters and the AC system to be equal to a predetermined active power reference value, and an automatic DC voltage regulator for regulating a DC voltage of the DC circuit to be equal to a predetermined DC voltage reference value. When an output signal (PAPR) from the automatic active power regulator of each converter for performing a coupling operation is input as an upper limit value of an output signal from the automatic DC voltage regulator, a DC voltage reference value ($E_{dp1}$) of one converter (110) is set to be equal to or larger than a DC voltage reference value ($E_{dp2}$) of the remaining power converter (210) ($E_{dp1} \geq E_{dp2}$) and the active power and the DC voltage are regulated. When the output signal (PAPR) from the automatic active power regulator of each converter for performing a coupling operation is input as a lower limit value of the output signal from the automatic DC voltage regulator, the DC voltage reference value ($E_{dp1}$) of one power converter (110) is set to be equal to or smaller than the DC voltage reference value of ($E_{dp2}$) the remaining power converter (210) ($E_{dp1} \leq E_{dp2}$) thus performing the above two control operations.

BRIEF DESCRIPTION OF THE DRAWINGS

FIGS. 5A to 5C show modifications of FIG. 4;

FIG. 10 shows a case wherein the automatic DC voltage regulator (AVR) in another arrangement of the embodiment in FIG. 1 is constituted by analog circuits;

FIG. 11 shows a case wherein the automatic DC voltage regulator (AVR) in another arrangement of the embodiment in FIG. 1 is constituted by computer control circuits;

FIG. 13 is a circuit diagram showing a control apparatus of a DC power coupling system according to still another embodiment of the present invention, wherein outputs from APR and AVR are switched and selected.

DETAILED DESCRIPTION OF THE PREFERRED EMBODIMENTS

Figure 1:
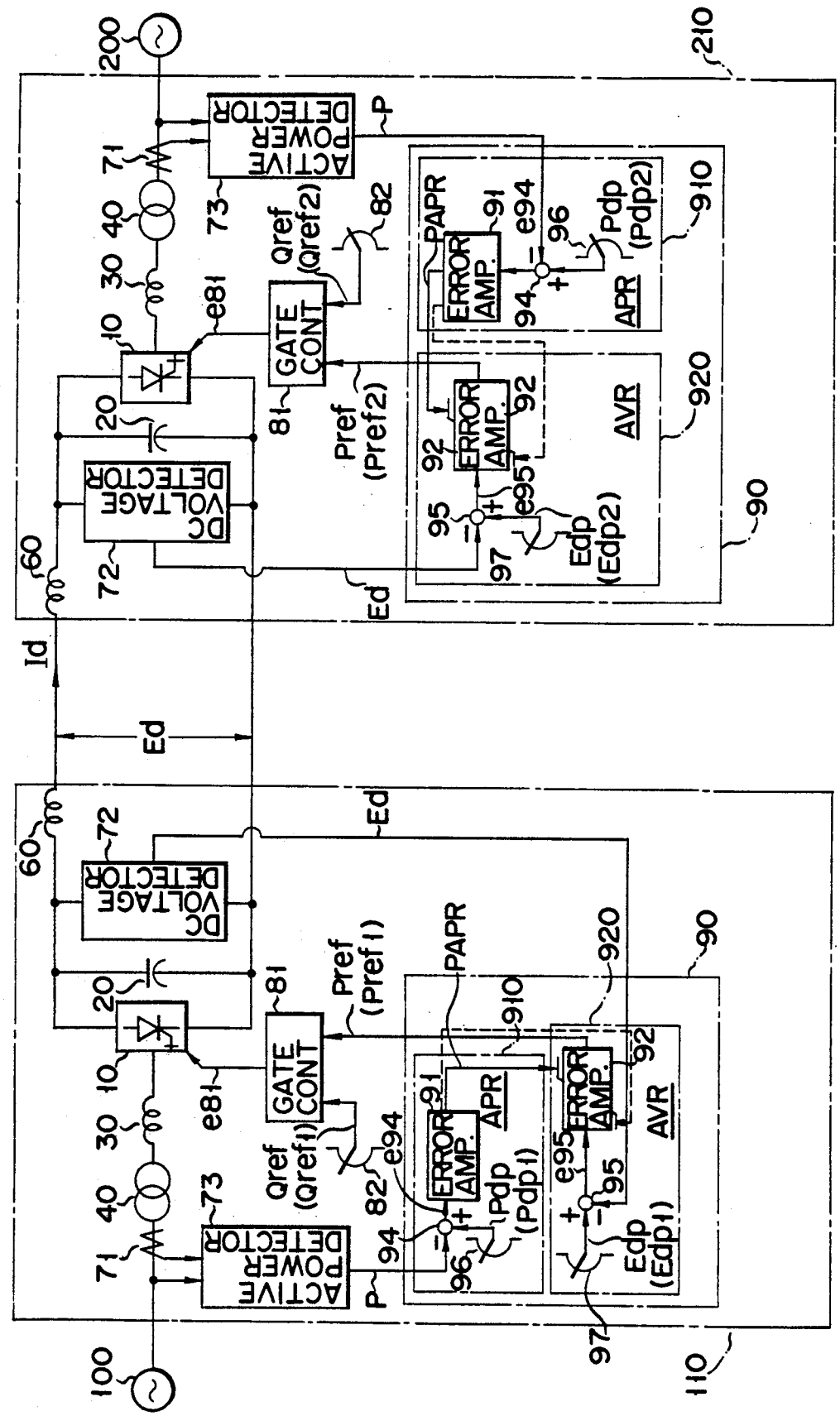
FIG. 1 is a circuit diagram showing a control apparatus of a DC power coupling system according to an embodiment of the present invention, the control apparatus having an arrangement in which an output from an automatic active power regulator (APR) defines an upper limit (or lower limit) value of an automatic DC voltage regulator (AVR)

Preferred embodiments of this invention will be described with reference to the accompanying drawings. In the description, the same or functionally equivalent elements are denoted by the same or similar reference numerals, to thereby simplify the description.

Figure 7:
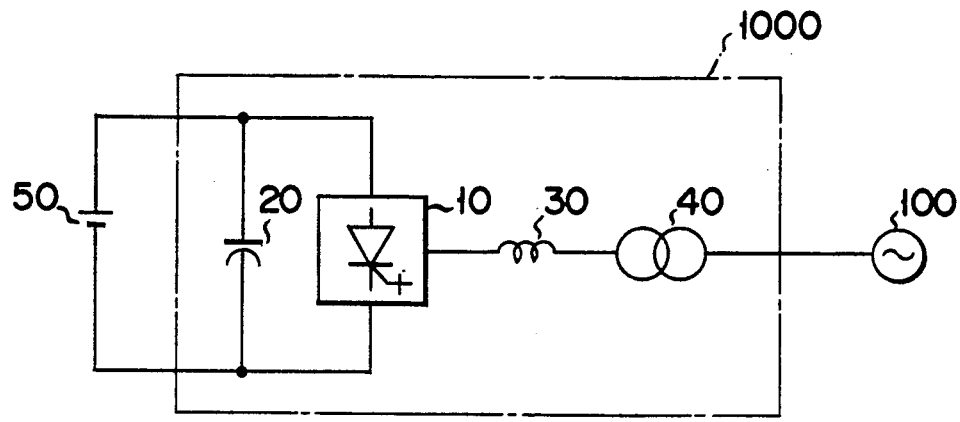
FIG. 7 is a circuit diagram for explaining a voltage source type self-exciting power converter.
Figure 8:
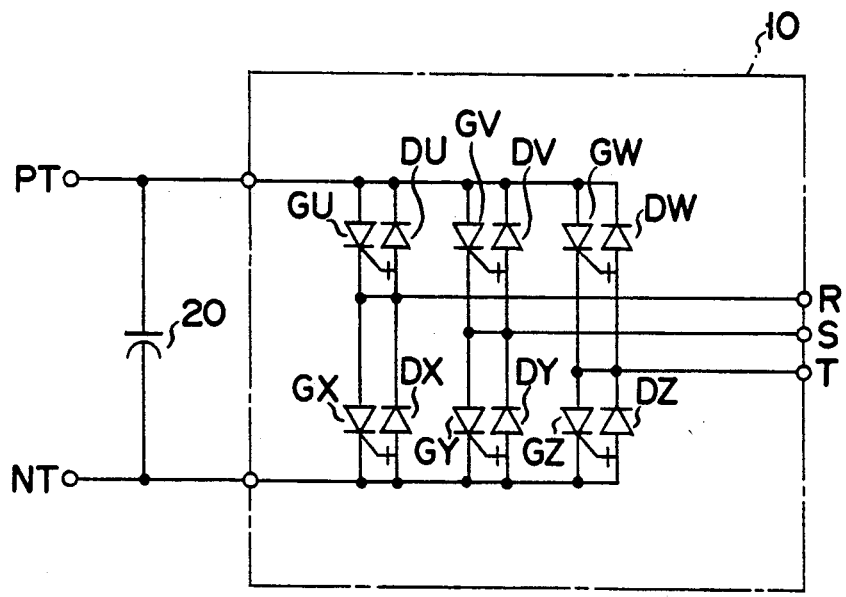
FIG. 8 is a circuit diagram showing an arrangement of an inverter main circuit which constitutes the converter shown in FIG. 7.

FIG. 7 is a circuit diagram for explaining a voltage source type self-exciting power converter (to be referred to as a converter hereinafter). FIG. 8 is a circuit diagram for explaining an arrangement of an inverter main circuit which constitutes the converter.

Referring to FIGS. 7 and 8, reference numeral 10 denotes an inverter; 20, a DC capacitor; 30, a coupling reactor; and 40, a coupling transformer. These circuits constitute converter 1000. Reference numeral 50 denotes a DC power source; and 100, an AC system power source (to be referred to as a system hereinafter).

In FIG. 8, reference symbols GU, GV, GW, GX, GY and GZ denote gate turn-off thyristors (to be referred to as GTOs hereinafter), each of which is one kind of controllable rectifying elements; and DU, DV, DW, DX, DY, and DZ, diodes. Reference symbols PT and NT denote DC terminals; and R, S, and T, AC terminals.

In FIG. 7, a principle of an operation for controlling power by coupling the inverter main circuit including inverter 10 and DC capacitor 20 to system 100 through coupling reactor 30 and coupling transformer 40 is disclosed in "Semiconductor Power Converter", the Institute of Electrical Engineers of Japan, Semiconductor Power Conversion System Technical Research Committee (1987, March 31, the first edition), pp. 216-220. An explanation for the principle is, therefore, omitted.

FIG 1 shows an arrangement of an embodiment according to the present invention.

Referring to FIG. 1, the same reference numerals denote the functionally equivalent elements as in FIG. 7. Reference numeral 60 denotes a DC reactor; 71, a current transformer; 72, a DC voltage detector; 73, an active power detector; 81, a gate controller; and 82, a reactive power reference setting circuit. Reference numeral 91 denotes an error signal amplifier; 94, a subtracter; and 96, an active power reference setting circuit. The above circuits 91, 94, and 96 constitute automatic active power regulator 910 (to be referred to as an APR hereinafter). Reference numeral 92 denotes an error signal amplifier; 95, a subtracter; and 97, a DC voltage reference setting circuit. The above circuits 92, 95, and 97 constitute automatic DC voltage regulator 920 (to be referred to as an AVR hereinafter). Reference numerals 100 and 200 denote AC systems; and 110 and 210, converters. Reference numeral 90 denotes an active power controller.

A case wherein an output signal (PAPR) from the APR is employed as an upper limit value of an output signal ($P_{ref}$) of the AVR will be described below.

Converters 110 and 210 have active power controllers 90 for performing the same function, respectively. Each of active power controllers 90 is constituted by APR 910 and AVR 920.

APR 910 outputs active power command PAPR as an upper limit value of an output signal ($P_{ref}$) from AVR 920 so as to control active power P from active power detector 73 to coincide with active power reference $P_{dp}$.

When error signal value e95 for causing DC voltage $E_{dp}$ from DC voltage detector 72 to coincide with DC voltage reference Edp is smaller than active power command PAPR, AVR 920 outputs error signal value e95 to gate controller 81 as active power command $P_{ref}$. When error signal value e95 is larger than active power command PAPR, AVR 920 outputs active power command PAPR to gate controller 81 as active power command $P_{ref}$.

Gate control circuit 81 outputs gate signal e81 in response to active power command Pref and reactive power command $Q_{ref}$ from reactive power reference setting circuit 82 to determine the width of a conducting period of inverter 10.

In converters 110 and 210, active power references $P_{dp}$, DC voltage references $E_{dp}$, reactive power references Qref, and active power commands $P_{ref}$ are often different from each other. For this reason, assume that the signals $P_{dp}$, $E_{dp}$, Qref, and Pref in converter 110 are respectively referred to as $P_{dp1}$, $E_{dp1}$, $Q_{ref1}$, and Pref1, and the signals $P_{dp}$, $D_{dp}$, $Q_{ref}$, and $P_{ref}$, in converter 210 are respectively referred to as $P_{dp2}$, $E_{dp2}$, $Q_{ref2}$, and $P_{ref2}$.

Although DC voltage reference $E_{dp1}$ can be smaller, assuming that DC voltage reference $E_{dp1}$ is set to be larger than DC voltage reference $E_{dp2}$ in this case, a function of the embodiment in FIG. 1 will be described hereinafter with reference to FIG. 2. In this case, the same positive value is set as active power references $P_{dp1}$ and $P_{dp2}$.

Figure 2:
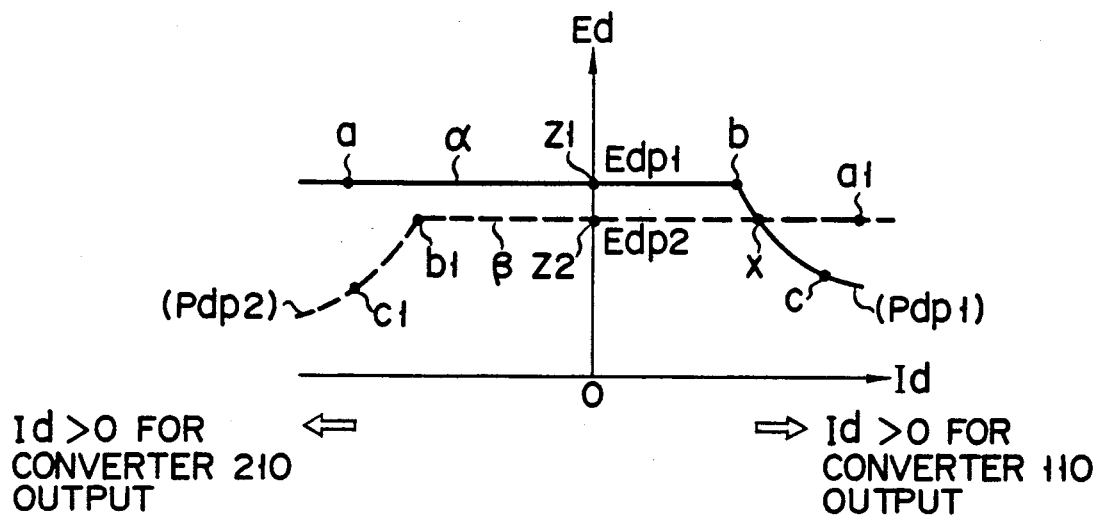
FIG. 2 is a view for explaining an operation of the apparatus in FIG. 1 (or FIG. 14) when a DC voltage reference ($E_{dp1}$) of one converter (110) is higher than a DC voltage reference ($E_{dp2}$) of the other converter (210)

In FIG. 2, an axis of ordinate represents DC voltage Ed, and an axis of abscissa represents positive DC current Id supplied from converter 110 to converter 210. Solid and dotted lines α and β represent operations of converters 110 and 210, respectively.

Solid line α representing an operation of converter 110 will be described below. As DC current $I_d$ is changed from a negative value to a positive value, an operating point of converter 110 is linearly moved from point a to point b through point Z1. At this time, in APR 910 in converter 110, active power reference $P_{dp1}$ is positive. For this reason, active power command PAPR is output from APR 910 as an upper limit value of an output signal of AVR 920 so that a curve represented by a product of DC voltage Ed and current $I_d$ which passes through points b, x, and c serves as active power reference $P_{dp1}$.

Active power P is set to be active power reference $P_{dp1}$ or less immediately before the operating point reaches point b from point a through point Z1 in FIG. 2. For this reason, error signal e94 output from subtracter 94 in converter 110 is positive. Therefore, a value (active power command value PAPR) is output from error signal amplifier 91 by an amplification function of amplifier 91. This value is larger than a value obtained by controlling DC voltage $E_d$ to be equal to DC voltage reference value $E_{dp1}$ by AVR 920. More specifically, a value of error signal e95 obtained by controlling DC voltage $E_d$ to be equal to DC voltage reference value $E_{dp1}$ is smaller than an upper limit value of an output signal from AVR 920. Therefore, the value of error signal e95 is output to gate controller 81 as signal $P_{ref1}$.

An operation from point b to point c through point x in FIG. 2 will be described below. When converter 110 supplies a direct current which is equal to or larger than a direct current at point b to converter 210, value $P_{ref1}$ controlled by AVR 920 in converter 110 becomes larger than active power command PAPR serving as an output signal from APR 910 which is input as an upper limit value of value $P_{ref1}$. More specifically, when active power command PAPR serving as an upper limit value is output to gate controller 81 as active power command $P_{ref1}$, an operation from point b to point c (automatic active power regulation) is performed. In this case, automatic DC voltage regulation for coinciding DC voltage $E_d$ with DC voltage reference $E_{dp1}$ is not performed.

As described above, when direct current I φ is increased from a negative value to a positive value, converter 110 performs an operation to cause the operating point to reach point b from point a through point Z1, and an operation from point b to point c through point b, in FIG. 2.

Dotted line β representing an operation of converter 210 will be described below.

In FIG. 2, direct current $I_d$ supplied from converter 110 to converter 210 is positive. This represents that a state wherein converter 110 supplies active power P from system 100 to converter 110 is set to be positive. This also represents an operation that the converter supplies AC power as DC power, i.e., an operation referred to as forward conversion. On the contrary, an operation that the converter supplies DC power as AC power is called inversion. When converter 110 performs inversion, direct current Id is negative.

Converter 210 performs inversion when converter 110 performs forward conversion. When converter 110 performs inversion, converter 210 performs forward conversion. In other words, in converters 110 and 210, forward conversion and inversion are performed alternately. Therefore, in FIG. 2, assuming that a positive direction of direct current Id in converter 210 is a direction from converter 210 to converter 110, an operation of converter 210 is represented by dotted line β in FIG. 2.

A DC voltage reference value in converter 210 is $E_{dp2}$. For this reason, when direct current $I_d$ in converter 210 is increased from a negative value to a positive value, an operating point of converter 210 reaches point b1 from point a1 through point Z2 by a function of AVR 920 in converter 210. When direct current $I_d$ is further increased, an operating point of converter 210 is moved from point b1 to point c1 on a curve (power regulation curve) wherein a product of DC voltage $E_d$ and current $I_d$ is equal to active power reference $P_{dp2}$, by a function of APR 910 in converter 210.

Although the operations of converters 110 and 210 have been described above with reference to FIG. 2, converters 110 and 210 are coupled to each other to exchange active power.

When converters 110 and 210 perform operations represented by solid and dotted lines α and β shown in FIG. 2, respectively, an operation is performed at point x (intersecting point between lines α and β) in FIG. 2. Since converter 110 attempts to increase DC voltage Ed up to reference value $E_{dp1}$, and converter 210 attempts to decrease DC voltage Ed to reference value $E_{dp2}$, converters 110 and 210 attempt to increase direct current Id supplied from converter 110 to converter 210. However, since active power setting value $P_{ref1}$ of converter 110 is positive, converter 110 moves its operating point to point x at which DC voltage $E_d$ is decreased to reference value $E_{dp2}$. Therefore, converter 210 is driven at point x by a function of AVR 910. In this state, DC voltage $E_d$ serves as reference value $E_{dp2}$, and active power is supplied from converter 110 to converter 210.

Even if converter 110 stops its operation when converters 110 and 210 are driven at point x in FIG. 2, converter 210 can move its operating point to point Z2 to continue an operation since direct current $I_d$ from converter 110 is set to be zero. Even if converter 210 stops its operation, converter 110 can move its operating point to point Z1 to continue an operation since a current supplied to converter 210 is set to be zero.

This represents an effect that even if one of two converters which are coupled to each other stops its operation, the remaining one can exchange reactive power between the converter and a system (100 or 200 in FIG. 1).

Figure 3:
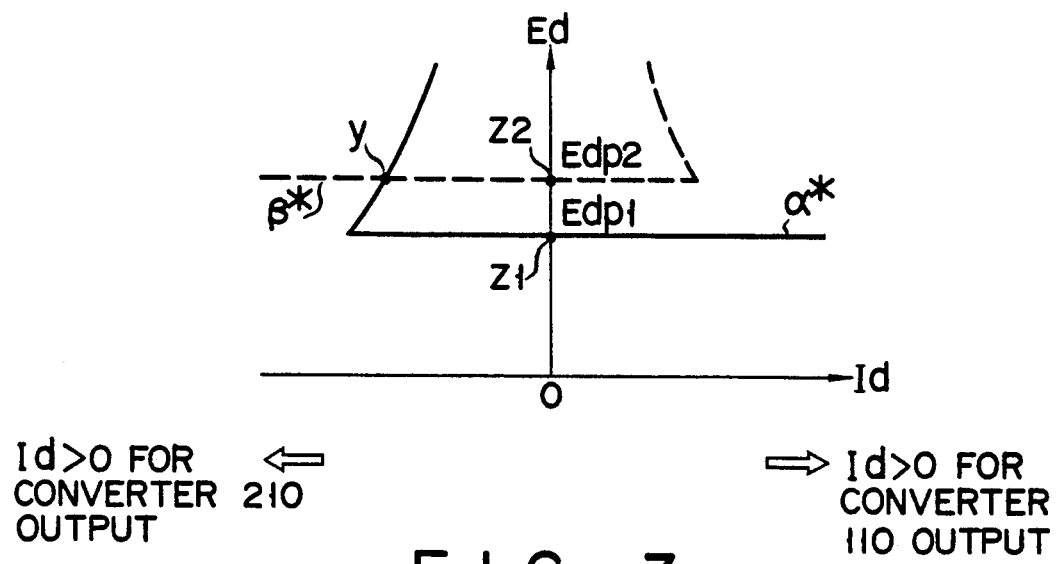
FIG. 3 is a view for explaining an operation of the apparatus in FIG. 1 (or FIG. 13) when a DC voltage reference ($E_{dp1}$) of one converter (110) is lower than a DC voltage reference ($E_{dp2}$) of the other converter (210)

The broken lines in FIG. 1 are provided for explaining an arrangement of an embodiment when an output from APR 910 is input as a lower limit value of an output signal from AVR 920, and FIG. 3 is a view for explaining an operation of the embodiment.

In this case, assume that DC voltage reference $E_{dp2}$ of converter 210 is set to be larger than DC voltage reference $E_{dp1}$ of converter 110. For the sake of descriptive convenience, active power references $P_{dp1}$ and $P_{dp2}$ of converters 110 and 210 are negative. In FIG. 3, solid line α* represents an operation of converter 110, and dotted line β* represents an operation of converter 210.

In FIG. 3, when both converters 110 and 210 are driven, point y serves as an operating point. When converter 210 is disabled, converter 110 can be driven at point Z1. When converter 110 is disabled, converter 210 can be driven at point Z2. In this case, even if one of the two converters which are coupled to each other stops its operation, the remaining converter can exchange reactive power between itself and the system.

Figure 4:
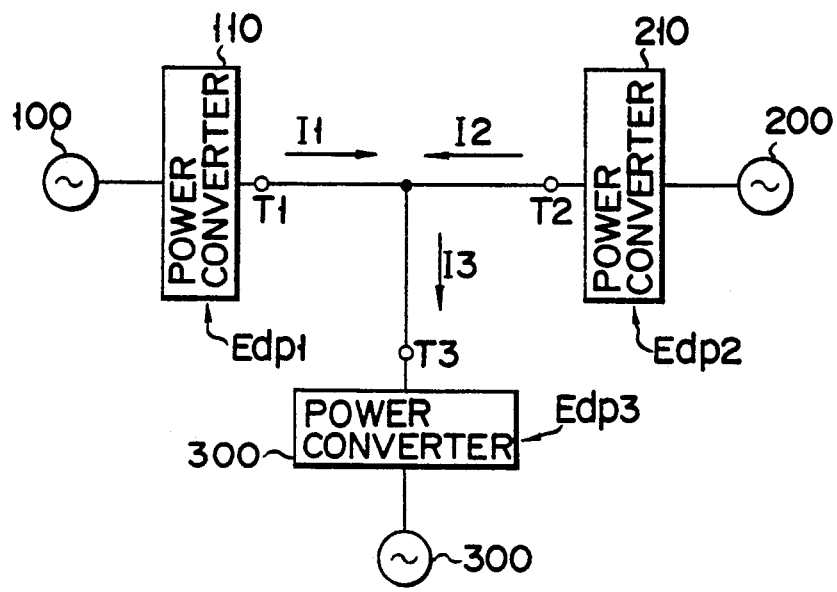
FIG. 4 is a view showing a control apparatus of a DC power coupling system according to still another embodiment of the present invention, wherein DC circuits of three power converters are coupled in parallel to each other.
Figure 6:
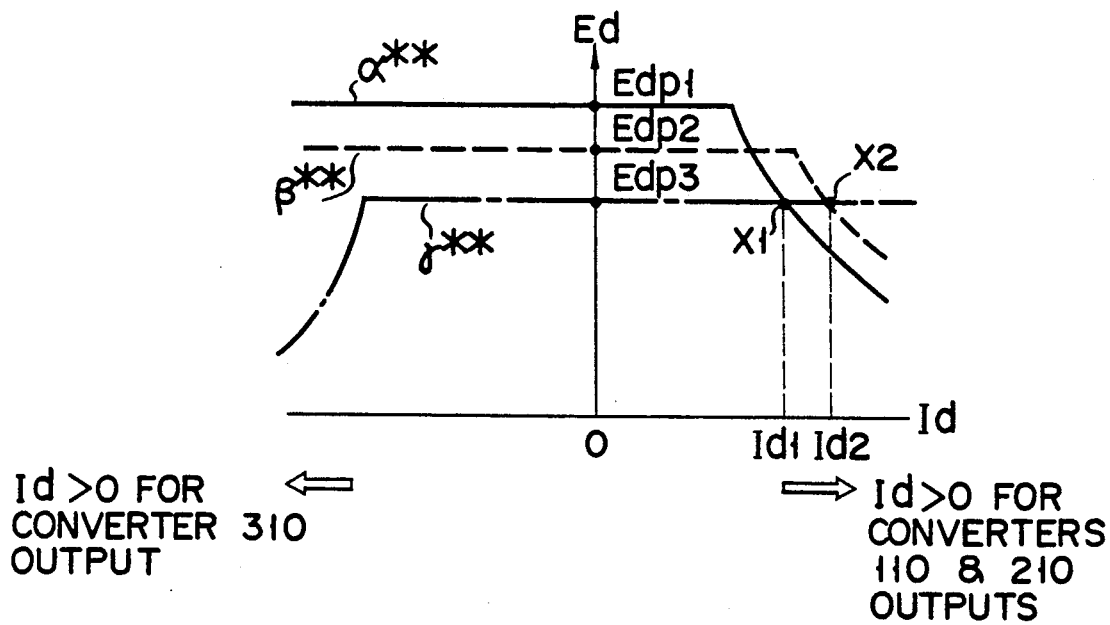
FIG. 6 is a view for explaining an operation of the apparatus in FIG. 4 when a DC voltage reference ($E_{dp1}$) of first a converter (110) is higher than a DC voltage reference ($E_{dp2}$) of a second converter (210), and the DC voltage reference ($E_{dp2}$) of the second converter (210) is higher than a DC voltage reference ($E_{dp3}$) of a third converter (310)

FIG. 4 is a circuit diagram showing still another embodiment. FIG. 4 is a circuit diagram showing a coupling system including three converters. These three converters are coupled in parallel to each other through DC terminals T1 to T3 to exchange active power. FIG. 6 is a view for explaining operations of the converters in FIG. 4.

The same reference numerals in FIG. 4 denote the functionally equivalent elements as in FIG. 1. Reference numeral 300 denotes a third AC system; and 310, a converter. Converter 310 may have the same arrangement as that of converter 110 or 210 in FIG. 1. Active power reference $P_{dp}$ is set to be value $P_{dp3}$, DC voltage reference $E_{dp}$ is set to be value $E_{dp3}$, and reactive power reference $Q_{ref}$ is set to be value $Q_{ref3}$.

FIG. 6 shows a state wherein an output signal from each APR (910) in converters 110, 210, and 310 is input as an upper limit value of an output signal (Pre=) from each AVR (920), the DC voltage references are set to be $E_{dp1} > E_{dp2} > E_{dp3}$, and active power references $P_{dp1}$, $P_{dp2}$ and $P_{dp3}$ are set to be positive.

In FIG. 6, solid line α represents an operation of converter 110, dotted line β represents an operation of converter 210, and alternate long and short dash line γ** represents an operation of converter 310. In the same manner as in FIG. 2, in only converter 310 wherein DC voltage reference $E_{dp}$ is set to be a minimum value, a direction of direct current $I_d$ is opposite to the direction of direct current $I_d$ in converters 110 and 210.

When converters 110, 210, and 310 are coupled to each other and are driven, an operating point of converter 110 is point x1, and forward conversion is performed to supply direct current $I_{d1}$. An operating point of converter 210 is point x2, and forward conversion is performed to supply direct current $I_{d2}$. Converter 310 maintains DC voltage Ed to value $E_{dp3}$, inversion is performed to obtain direct current $I_{d3}$ which is a sum of direct currents $I_{d1}$ and $I_{d2}$. Active power in the DC line is represented by DC current × DC voltage. More specifically, active power P obtained by the following equation is supplied from converter 310 to system 300:

$$P = (I_{d1} + I_{d2}) \times E_{dp3} \ldots \quad (1)$$

Even if converter 110 is disabled in this drive state, operations of converters 210 and 310 can continue at point x2. Even if converter 210 stops its operation, converters 210 and 310 can be driven at point x1. If converter 310 stops its operation, operations of converters 110 and 210 are shown in FIG. 2. Therefore, point x in FIG. 2 serves as an operating point.

For example, if converter 310 stops its operation, an operation of converter 210 is changed from forward conversion to inversion. In order to prevent this change, some methods may be employed. According to one of the methods, DC voltage reference values $E_{dp}$ of converter 110 and 210 may be set to be value $E_{dp1}$. Therefore, even if converter 310 stops its operation, both converters 110 and 210 operate to set DC voltage $E_d$ to be value $E_{dp1}$ by a function of AVRs (920) of converters 110 and 210. The converters do not exchange active power P, but operations for exchanging reactive power between converter 110 and system 100 or between converter 210 and system 200 can continue.

FIGS. 5A to 5C show modifications of the embodiment shown in FIG. 4. FIG. 5A shows a case wherein AC system 200 in FIG. 4 is substituted by load 200A such as a three-phase motor. FIG. 5B shows a case wherein converter 310 in FIG. 4 is substituted by DC/DC converter 310B, and load 300B such as a DC motor is connected thereto. In FIG. 5C, DC/DC converter 210C for driving load 200C such as a DC motor is used in place of converter 210 in FIG. 4, and DC power system 300C such as a battery is used in place of converter 310.

Figure 9:
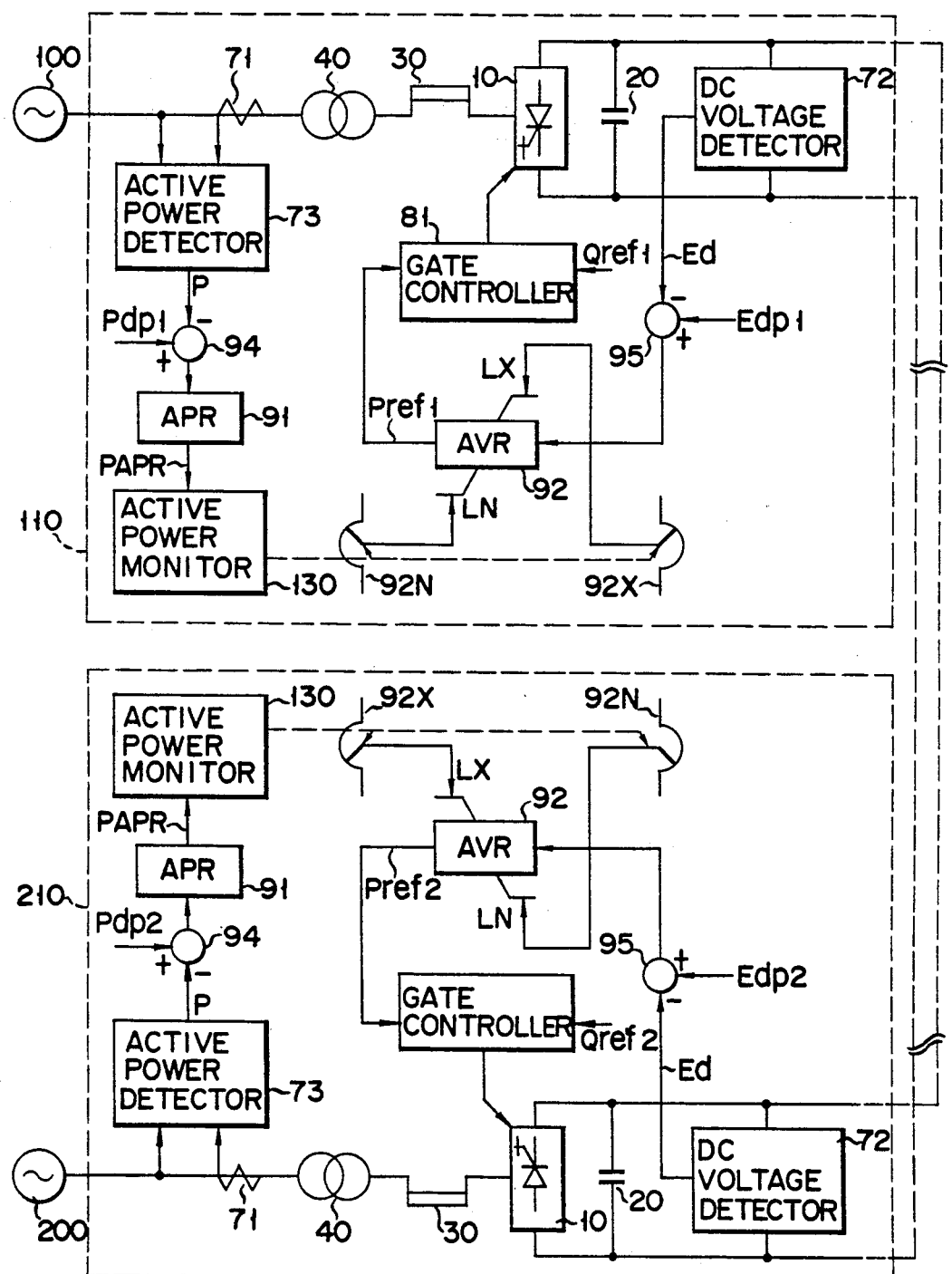
FIG. 9 is a circuit diagram showing a control apparatus of a DC power coupling system according to another embodiment of the present invention, the apparatus having an arrangement for manually controlling upper and/or lower limit values of an automatic DC voltage regulator (AVR)

FIG. 9 shows an embodiment wherein an operator of a coupling system can manually set upper or lower limit value LX or LN of AVR 92 while monitoring an active power of AC system 100 (or 200) by active power monitor 130.

In the embodiment in FIG. 9, in a normal mode, setting circuit 92X or 92N is servo-controlled to follow active power command value PAPR monitored by monitor 130, and upper or lower limit value LX or LN can be automatically set, as in the embodiment of FIG. 1. The embodiment in FIG. 9 which allows a manual setting operation by an operator, however, can correspond to a special setting operation of upper or lower limit value LX or LN which is shifted from the automatically set upper or lower limit value LX or LN.

FIG. 10 shows a detailed arrangement of AVR 92. AVR 92 has a proportional-plus-integral type transfer function (KP+KI/s) (where s is a Laplace operator). AVR 92 has a function for externally defining upper or lower limit value LX or LN of output $P_{ref}$ thereof. AVR 92 performs a proportional-plus-integral operation of value EPR of output signal e95 from subtracter 95 to output active power command $P_{ref}$ between upper and lower limits LX and LN.

When AVR 92 in FIG. 10 is applied to the circuit in FIG. 1, upper limit value LX of a proportional-plus-integral operation is controlled in response to output signal PAPR from an APR. In this case, LX=PAPR, and lower limit value LN of the proportional-plus-integral operation is fixed to be a predetermined value. On the other hand, when lower limit value LN of a proportional-plus-integral operation is controlled in response to output signal PAPR from the APR, LN=PAPR, and upper limit value LX of the proportional-plus-integral operation is fixed to be a predetermined value.

FIG. 11 shows hardware when AVR 92 in FIG. 10 is constituted using a computer. A flow chart in FIG. 12 shows an arrangement of software executed by CPU 120 in FIG. 11.

Analog output $E_d$ from DC voltage detector 72 is input to CPU 120 through A/D converter 121, analog DC voltage reference $E_{dp}$ is input to CPU 120 through A/D converter 122, and analog output PAPR from an APR is input to CPU 120 through A/D converter 123. CPU 120 executes the software shown in FIG. 12. An intermediate result and a final result (digital data $P_{ref}$) of execution of the software are stored in memory 125, and final result $P_{ref}$ is converted into analog active power command $P_{ref}$ by D/A converter 124.

Figure 12:
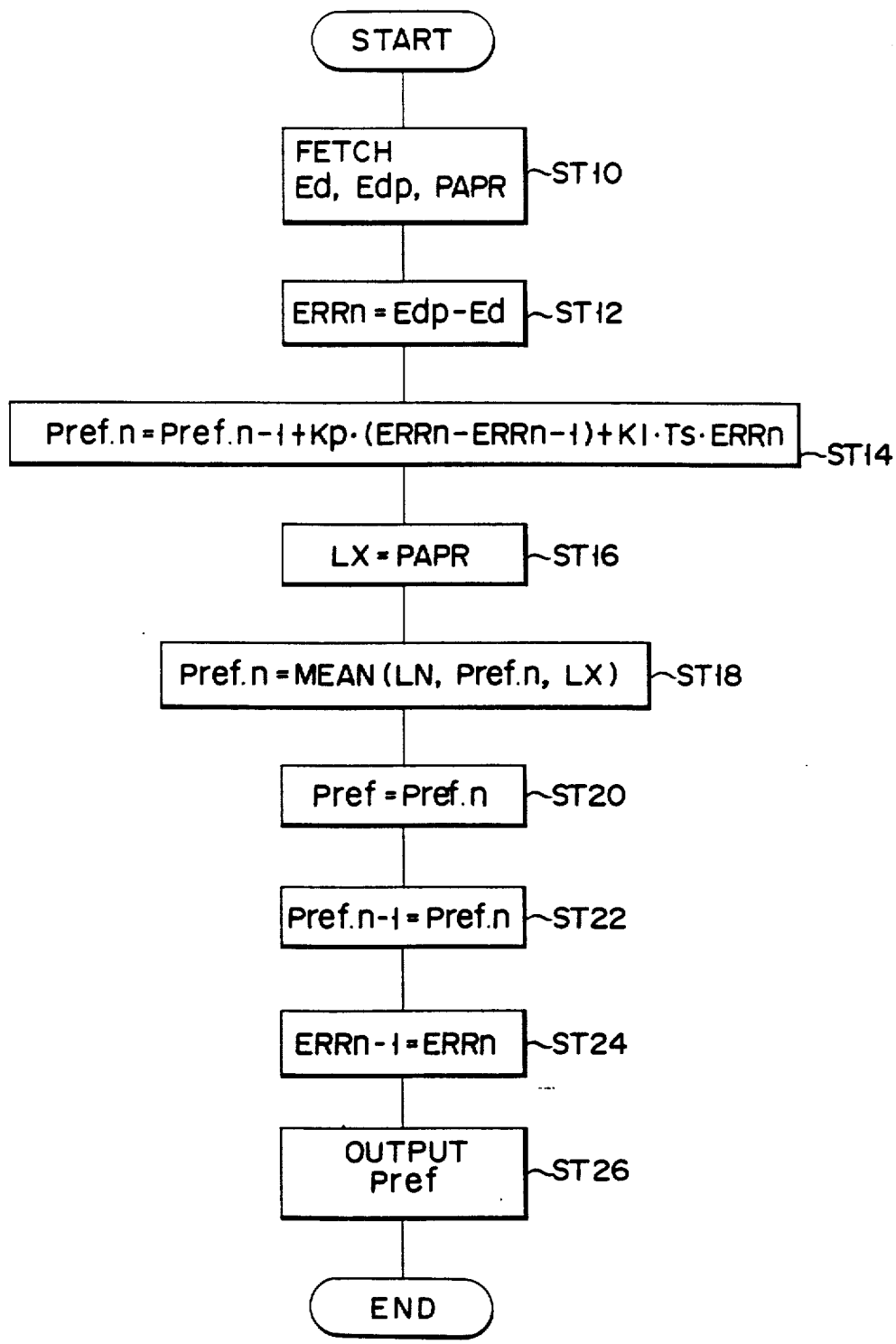
FIG. 12 is a flow chart showing control procedures executed by the computer control circuits shown in FIG. 11.

CPU 120 executes the software in FIG. 12 every operation period Ts given by timer 126.

More specifically, when a trigger operation is performed by timer 126, CPU 120 respectively fetches three data $E_d$, $E_{dp}$, and PAPR from A/D converters 121 to 123 (ST 10). If the number of trigger operations performed by timer 126 is n at the present time, (EPRn = $E_{dp} - E_d$) representing a current DC voltage control error is calculated by CPU 120 (ST 12).

Thereafter, the following calculation using a difference equation is performed by CPU 120 (ST 14).

$$P_{ref}n = P_{ref}n - 1 + Kp \cdot (ERR_n - ERR_{n-1}) + KI \cdot Ts \cdot ERR_n \ldots \quad (2)$$

where $P_{ref}n$ is a current $P_{ref}$, $P_{ref}n-1$ is a $P_{ref}$ in the preceding calculation, Kp and KI are proportional and integral constants of a proportional-plus-integral operation, respectively, and Ts is an operation period of CPU 120.

When the embodiment in FIG. 1 is exemplified, lower limit value LN of the proportional-plus-integral operation is fixed in advance, and data PAPR fetched in ST 10 is employed as upper limit value LX of the proportional-plus-integral operation (ST 16).

Of the three values thus obtained (lower limit value LN which is fixed in advance, value $P_{ref}n$ calculated in ST 14, and value PAPR employed in ST 16), a value having an intermediate value is employed as a new value $P_{ref}n$ (ST 18).

Then, the new value $P_{ref}n$=Pref (ST 20), $P_{ref}n$=$P_{ref} \cdot n-1$ (ST 22), and a current error $ERR_n$=$ERR_{n-1}$ (ST 24). Then, data $P_{ref}$ obtained in ST 20 is output (ST 26).

FIG. 13 shows still another embodiment of the present invention. The same reference numerals in FIG. 13 denote the functionally equivalent elements as in FIG. 1.

A case wherein selector 93 is set to select a minimum value of inputs (PAPR, PAVR) will be described hereinafter.

Converters 110 and 210 respectively include active power control apparatuses 90 having the same function. Each active power control apparatus 90 is constituted by automatic active power regulator (APR) 910, automatic DC voltage regulator (AVR) 920, and selector 93. APR 910 outputs active power command PAPR to selector 93, and controls active power P from active power detector 73 to coincide with active power reference $P_{dp}$. AVR 920 outputs active power command PAVR to selector 93, and controls DC voltage $E_d$ from DC voltage detector 72 to coincide with DC voltage reference $E_{dp}$.

Selector 93 compares active power command PAPR with active power command PAVR, and selects a command having a minimum value to output the selected command to gate controller 81 as active power command $P_{ref}$.

Gate controller 81 outputs a gate signal for determining the width of an energization period of inverter 10 in response to active power command Pref and reactive power command Qref from reactive power reference setting circuit 82.

In converter 110, data $P_{dp}$, $E_{dp}$, $Q_{ref}$, and $P_{ref}$ are referred to as $P_{dp1}$, $E_{dp1}$, $Q_{ref1}$, and $P_{ref1}$, respectively. In converter 210, data $P_{dp}$, $E_{dp}$, $P_{ref}$, and $P_{ref}$ are set to be $P_{dp2}$, $E_{dp2}$, $Q_{ref2}$, and $P_{ref2}$, respectively.

Although DC voltage reference $E_{dp1}$ or $E_{dp2}$ may be smaller, assume that DC voltage reference $E_{dp2}$ is set to be larger than DC voltage reference $E_{dp2}$ in this embodiment. In this case, active power references $P_{dp1}$ and $P_{dp2}$ have the same positive value.

An operation of the embodiment in FIG. 13 is show in FIG. 2.

An operation performed when selector 93 in FIG. 13 is set to select a maximum value will be described hereinafter with reference to FIG. 3. In this case, assume that DC voltage reference $E_{dp2}$ of converter 210 is set to be larger than DC voltage reference $E_{dp1}$ of converter 110. For the sake of descriptive convenience, active power references $P_{dp1}$ and $P_{dp2}$ of converters 110 and 210 are set to be negative.

In FIG. 3, solid line $\alpha^*$ represents an operation of converter 110, and dotted line $\beta^*$ represents an operation of converter 210. In FIG. 3, when both converters 110 and 210 are driven, point y serves as an operating point. Converter 110 can be driven at point Z1 when converter 210 is disabled, and converter 210 can be driven at point Z2 when converter 110 is disabled. Also in this case, even if one of two converters which are coupled to each other is disabled, the remaining one can be driven to exchange reactive power between itself and the system.

As has been described above, according to the present invention, even if one converter for performing a coupling operation stops its operation due to, e.g., a failure, the remaining converter can be driven without interruption.

Although a case wherein one converter of two converters for performing a coupling operation is disabled has been described above, even if only one converter can be active, an operation of this converter can continue.

What is claimed is:

1. A control apparatus of a DC power coupling system being formed of a plurality of power converters which are coupled together by a DC circuit, wherein:
   one of said power converters comprises:
   first power exchange means for exchanging electric power between a first AC power system and said DC circuit;
   first power detecting means for detecting a first active power of the electric power exchanged between said first AC power system and said DC circuit;
   first voltage detecting means for detecting a first DC voltage of said DC circuit;
   first power exchange control means for controlling the power exchanging operation of said first power exchange means to be based on either one of said first active power and said first DC voltage; and
   first determining means for determining which one of said first active power and said first DC voltage is to be used for the control performed by said first power exchange control means in accordance with a relative magnitude of said first DC voltage with respect to said first active power; and
   another of said power converters comprises:
   second power exchange means for exchanging electric power between a second AC power system and said DC circuit;
   second power detecting means for detecting a second active power of the electric power exchanged between said second AC power system and said DC circuit;
   second voltage detecting means for detecting a second DC voltage of said DC circuit;
   second power exchange control means for controlling the power exchanging operation of said second power exchange means to be based on either one of said second active power and said second DC voltage; and
   second determining means for determining which one of said second active power and said second DC voltage is to be used for the control performed by said second power exchange control means in accordance with a relative magnitude of said second DC voltage with respect to said second active power.

2. A control apparatus according to claim 1, wherein still another one of said power converters comprises:
   third power exchange means for exchanging electric power between a third AC power system and said DC circuit;
   third power detecting means for detecting a third active power of the electric power exchanged between said third AC power system and said DC circuit;
   third voltage detecting means for detecting a third DC voltage of said DC circuit;
   third power exchange control means for controlling the power exchanging operation of said third power exchange means to be based on either one of said third active power and said third DC voltage; and
   third determining means for determining which one of said third active power and said third DC voltage is to be used for the control performed by said third power exchange control means in accordance with a relative magnitude of said third DC voltage with respect to said third active power.

3. A control apparatus according to claim 2, wherein
   (a) said first power exchange control means includes:
   first power control circuit means for generating a first active power control signal in accordance with a difference between a first active power reference and said first active power; and
   first voltage control circuit means for generating a first DC voltage control signal in accordance with a difference between a first DC voltage reference and said first voltage;
   (b) said first determining means includes:
   means for generating a first power instruction signal having a magnitude corresponding to said first DC voltage control signal, a magnitude of said first power instruction signal depending on a magnitude of said first active power control signal, and said first power instruction signal being used for the control performed by said first power exchange control means,
   (c) said second power exchange control means includes:

second power control circuit means for generating a second active power control signal in accordance with a difference between a second active power reference and said second active power; and second voltage control circuit means for generating a second DC voltage control signal in accordance with a difference between a second DC voltage reference and said second DC voltage, (d) said second determining means includes:
means for generating a second power instruction signal having a magnitude corresponding to said second DC voltage control signal, a magnitude of said second power instruction signal depending on a magnitude of said second active power control signal, and said second power instruction signal being used for the control performed by said second power exchange control means, (e) said third power exchange control means includes:
third power control circuit means for generating a third active power control signal in accordance with a difference between a third active power reference and said third active power; and
third voltage control circuit means for generating a third DC voltage control signal in accordance with a difference between a third DC voltage reference and said third DC voltage, and (f) said third determining means includes:
means for generating a third power instruction signal having a magnitude corresponding to said third DC voltage control signal, a magnitude of said third power instruction signal depending on a magnitude of said third active power control signal, and said third power instruction signal being used for the control performed by said third power exchange control means.

4. A control apparatus according to claim 3, wherein at least two of said first, second, and third DC voltage references are different from one another.

5. A control apparatus according to claim 1, wherein
(a) said first power exchange control means includes:
first power control circuit means for generating a first active power control signal in accordance with a difference between a first active power reference and said first active power; and
first voltage control circuit means for generating a first DC voltage control signal in accordance with a difference between a first DC voltage reference and said first DC voltage, (b) said first determining means includes:
means for generating a first power instruction signal having a magnitude corresponding to said first DC voltage control signal, a magnitude of said first power instruction signal having an upper limit determined by a magnitude of said first active power control signal, and said first power instruction signal being used for the control performed by said first power exchange control means, (c) said second power exchange control means includes:
second power control circuit means for generating a second active power control signal in accordance with a difference between a second active power reference and said second active power; and
second voltage control circuit means for generating a second DC voltage control signal in accordance with a difference between a second DC voltage reference and said second DC voltage, and (d) said second determining means includes:
means for generating a second power instruction signal having a magnitude corresponding to said second DC voltage control signal, a magnitude of said second power instruction signal having an upper limit determined by a magnitude of said second active power control signal, and said second power instruction signal being used of the control performed by said second power exchange control means.

6. A control apparatus according to claim 5, wherein said first DC voltage reference is set to be equal to or larger than said second DC voltage reference.

7. A control apparatus according to claim 1, wherein
(a) said first power exchange control means includes:
first power control circuit means for generating a first active power control signal in accordance with a difference between a first active power reference and said first active power; and
first voltage control circuit means for generating a first DC voltage control signal in accordance with a difference between a first DC voltage reference and said first DC voltage, (b) said first determining means includes:
means for generating a first power instruction signal having a magnitude corresponding to said first DC voltage control signal, a magnitude of said first power instruction signal having an lower limit determined by a magnitude of said first active power control signal, and said first power instruction signal used for the control performed by said first power exchange control means, (c) said second power exchange control means includes:
second power control circuit means for generating a second active power control signal in accordance with a difference between a second active power reference and said second active power; and
second voltage control circuit means for generating a second DC voltage control signal in accordance with a difference between a second DC voltage reference and said second DC voltage, and (d) said second determining means includes:
means for generating a second power instruction signal having magnitude corresponding to said second DC voltage control signal, magnitude of said second power instruction signal having an lower limit determined by a magnitude of said second active power control signal, and said second power instruction signal being used for the control performed by said second power exchange control means.

8. A control apparatus according to claim 7, wherein said first DC voltage reference is set to be equal to or smaller than said second DC voltage reference.

9. A control apparatus according to claim 1, wherein
(a) said first power exchange control means includes:
first power control circuit means for generating a first active power control instruction in accordance with a difference between a first active power reference and said first active power; and first voltage control circuit means for generating a first DC voltage control instruction in accordance with a difference between a first DC voltage reference and said first DC voltage, (b) said first determining means includes:
means for selecting a smaller one of said first active power control instruction, the selected instruction being used for the control performed by said first power exchange control means, (c) said second power exchange control means includes:
second power control circuit means for generating a second active power control instruction in accordance with a difference between a second active power reference and said second active power; and
second voltage control circuit means for generating a second DC voltage control instruction in accordance with a difference between said second DC voltage and a second DC voltage reference which is equal to or smaller than said first DC voltage reference, and (d) said second determining means includes:
means for selecting a smaller one of said second active power control instruction and said second DC voltage control instruction, the selected instruction being used for the control performed by said first power exchange control means.

10. A control apparatus according to claim 1, wherein (a) said first power exchange control means includes:
first power control circuit means for generating a first active power control instruction in accordance with a difference between a first active power reference and said first active power; and
first voltage control circuit means for generating a first DC voltage control instruction in accordance with a difference between a first DC voltage reference and said first DC voltage, (b) said first determining means includes:
means for selecting a larger one of said first active power control instruction and said first DC voltage control instruction, the selected instruction being used for the control performed by said first power exchange control means, (c) said second power exchange control means includes:
second power control circuit means for generating a second active power control instruction in accordance with a difference between a second active power reference and said second active power; and
second voltage control circuit means for generating a second DC voltage control instruction in accordance with a difference between said second DC voltage and a second DC voltage reference which is equal to or larger than said first DC voltage reference, and (d) said second determining means includes:
means for selecting a larger one of said second active power control instruction, and said second DC voltage control instruction the selected instruction being used for the control performed by said first power exchange control means.

11. A control apparatus according to claim 1, wherein
(a) said first power exchange control means includes:

first power control circuit means for generating a first active power control signal in accordance with a difference between a first active power reference and said first active power; and
first voltage control circuit means for generating a first DC voltage control signal in accordance with a difference between a first DC voltage reference and said first DC voltage, and (b) said first determining means includes:
means for generating a first power instruction signal having a magnitude corresponding to said first DC voltage control signal, a magnitude of said first power instruction signal having an upper limit determined by a magnitude of said first active power control signal, said first power instruction signal being used for the control performed by said first power exchange control means.

12. A control apparatus according to claim 11, wherein said generating means includes a propotional and integrating amplifier, having a limiting level of said first active power control signal, for amplifying said first DC voltage control signal to generate said first power instruction signal.

13. A control apparatus according to claim 1, wherein (a) said first power exchange control means includes:
first power control circuit means for generating a first active power control signal in accordance with a difference between a first active power reference and said first active power; and
first voltage control circuit means for generating a first DC voltage control signal in accordance with a difference between a first DC voltage reference and said first DC voltage, and (b) said first determining means includes:
means for generating a first power instruction signal having a magnitude corresponding to said first DC voltage control signal, a magnitude of said first power instruction signal having an lower limit determined by a magnitude of said first active power control signal, said first power instruction signal being used for the control performed by said first power exchange control means.

14. A control apparatus according to claim 13, wherein said generating means includes a propotional and integrating amplifier, having a limiting level of said first active power control signal, for amplifier said first DC voltage control signal to generate said first power instruction signal.

15. A control apparatus according to claim 1, wherein
said first power exchange control means includes:
first power control circuit means for generating a first active power control signal in accordance with a difference between a first active power reference and said first active power, and
said first determining means includes computer means for performing the flowing steps for each of predetermined operation periods:
(ST 10) fetching a first DC voltage reference, said first DC voltage, and said first active power control signal;
(ST 12) detecting a present difference between said first DC voltage reference and said first DC voltage;

(ST 14) calculating a sum of (i) a preceding power instruction (ii), a first value obtained by modifying a change of said present difference by a predetermined proportional constant, and (iii) a second value obtained by modifying said present difference by a predetermined integrating constant as well as a predetermined integrating period;

(ST16) setting said first active power control signal as either one of an upper limiting value of said sum and a lower limiting value of said sum;

(ST 18) selecting a mean value of said upper limiting value, said sum, and said lower limiting value;

(ST 20) setting said mean value as an active power instruction;

(ST 22) setting said mean value as said preceding power instruction (ST 24) setting said present difference as a preceding difference which is used in a subsequent one of said predetermined operation periods; and (ST 26) outputting said active power instruction which is used for controlling the power exchanging operation of said first power exchange means.

* * * * *

UNITED STATES PATENT AND TRADEMARK OFFICE
CERTIFICATE OF CORRECTION

PATENT NO. : 5,010,467  
DATED : April 23, 1991  
INVENTOR(S) : Yukio Tokiwa et al Page 1 of 3

It is certified that error appears in the above-identified patent and that said Letters Patent is hereby corrected as shown below:

In the drawings, sheet 4 containing Figs. 5A, 5B, 5C and sheet 8 containing Fig. 12, are incomplete and repetive, and should be deleted to be replaced with sheets 4 and 8, as shown on the attached pages.

Signed and Sealed this

Tenth Day of November, 1992

*Attest:*

DOUGLAS B. COMER

*Attesting Officer*   Acting Commissioner of Patents and Trademarks

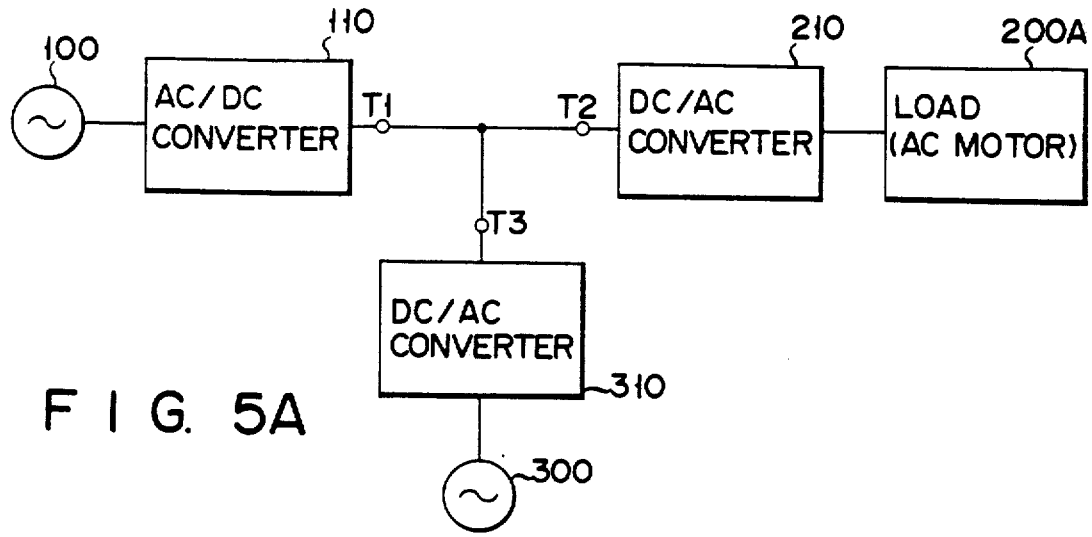
F I G. 5A
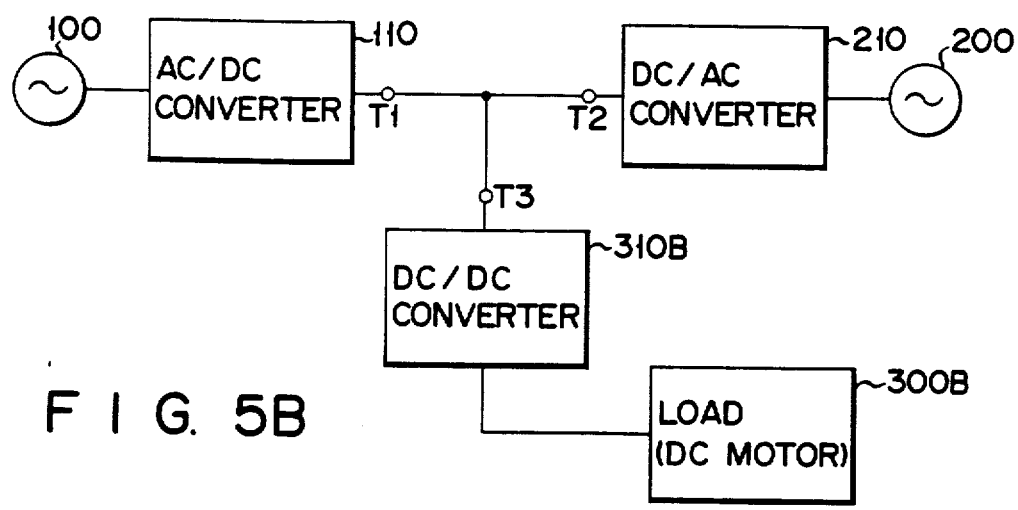
F I G. 5B
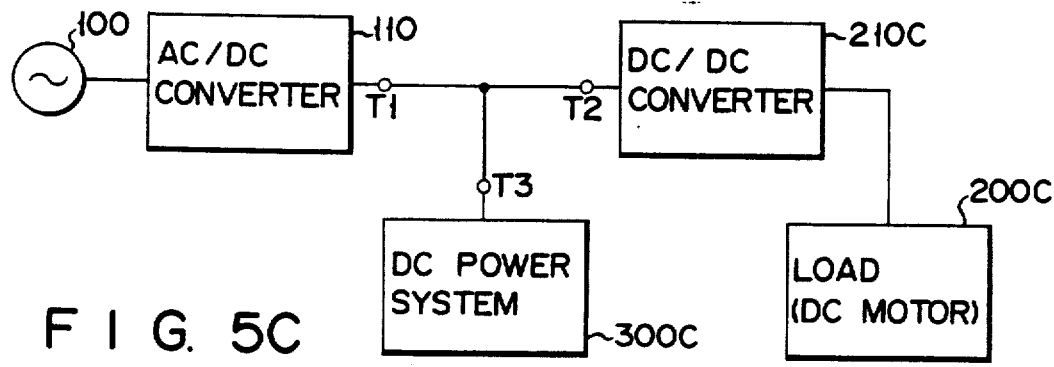
F I G. 5C